United States Patent [19]

Kleimenhagen

[11] Patent Number: 4,479,772

[45] Date of Patent: Oct. 30, 1984

[54] BLOW MOLDING MACHINE EMPLOYING ROTATABLY DRIVEN WHEELS

[75] Inventor: Günter Kleimenhagen, Hamburg, Fed. Rep. of Germany

[73] Assignee: Krupp Corpoplast Maschinenbau GmbH, Hamburg, Fed. Rep. of Germany

[21] Appl. No.: 396,888

[22] Filed: Jul. 9, 1982

[30] Foreign Application Priority Data

Jul. 30, 1981 [DE] Fed. Rep. of Germany ....... 3130129

[51] Int. Cl.³ .............................................. B29C 17/07
[52] U.S. Cl. ................................... 425/526; 264/535; 425/534; 425/539; 425/540
[58] Field of Search ............... 425/526, 534, 539, 540; 264/535; 198/480, 482, 580

[56] References Cited

U.S. PATENT DOCUMENTS 3,601,242  8/1971  Reinemuth et al. ............ 198/482 X
4,214,860  7/1980  Kleimenhagen et al. ....... 425/534 X
4,299,549  11/1981 Suzuki et al. .................... 425/534 X Primary Examiner—Jan Silbaugh
Attorney, Agent, or Firm—Posnack, Roberts, Cohen & Spiecens

[57] ABSTRACT

The number of blow mold stations being associated with a blow wheel of a blow molding machine determines a large pitch of the mandrel receiving positions of the blow wheel. Contrarily the mandrels carrying the parisons are disposed very close to each other on the heating wheel which thus has a substantially smaller pitch. The larger pitch of the blow wheel shall be maintained throughout the complete machine to simplify the transfer of the parison. Accordingly the heating wheel receives the same pitch as the blow wheel including additional mandrel receiving positions which are served in a plurality of subsequent revolutions of the heating wheel.

3 Claims, 2 Drawing Figures

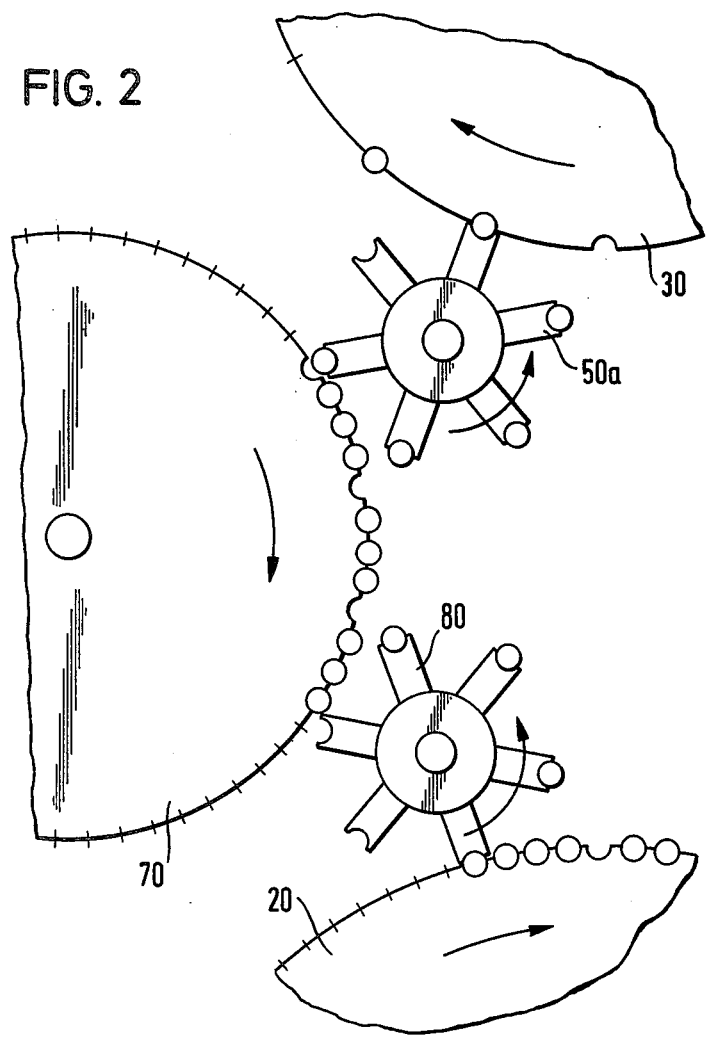

BLOW MOLDING MACHINE EMPLOYING ROTATABLY DRIVEN WHEELS

FIELD OF THE INVENTION

The invention relates to a blow molding machine having rotatably driven wheels or plates for delivery of parisons positioned on mandrels to and from heating blow mold stations.

BACKGROUND

Blow mold machines having a rotatably driven heating wheel and a rotatably driven blowing wheel are well-known in which parisons positioned on mandrels or pins are carried on a heating wheel pass heating means such as radiators to be heated up to blowing temperature. They are subsequently taken out by means of a transfer device and delivered on to the blowing wheel on which the parisons are enclosed between a pair of blow mold portions and blown to the final article. The dimensions of the shape of the blow mold portions and the actuating means associated therewith result in relatively large peripheral distances of the mandrel receiving positions on the blow wheel. These peripheral distances determine the pitch of the wheel. Accordingly, the blow wheel is a wheel having a large pitch.

If one selects the pitch of the heating wheel to be identical to the pitch of the blowing wheel, the transfer from the heating wheel to the blowing wheel is very simple. However, a large pitch of the heating wheel is not desirable as the diameter of the heating wheel must be substantially increased to allow heating a certain number of parisons to the desired blowing temperature which number is determined by the blowing conditions on the blowing wheel. Therefore the mandrels on the heating wheel are spaced at very small peripheral distances. From this, it follows that the heating wheel is a wheel having a small pitch.

From this in turn, it follows that the transfer device between the heating wheel and the blowing wheel must compensate for the different pitch sizes of both wheels. In other words, the transfer velocity of the transfer device must be delayed after taking out a mandrel of the heating wheel to deliver the mandrel into the next following mandrel receiving position of the blowing wheel. Subsequently, the return velocity of the transfer device to the heating wheel must be accelerated. This requires a substantial structural complication of the transfer devices including rotatable and cam controlled transfer arms for example.

SUMMARY OF INVENTION

An object of the present invention is to improve blow molding machines to incorporate a transfer device between wheels having large and small piches which transfer device has an extremely simple structure.

According to the invention, there is provided a transfer means which cooperates with any n-th mandrel receiving position of a wheel having a small pitch, wherein $n \geq 2$ and wherein the pitch of the wheel is selected so that each mandrel receiving position coacts with the transfer means after at least n revolutions of the wheel.

According to the invention, the movement of the transfer means for taking out a mandrel of the small pitch wheel and delivering the mandrel to the large pitch wheel is exclusively determined by the peripheral distances of the mandrel receiving positions of the large pitch wheel thus avoiding any delayed or accelerated motions of the transfer means. According to the invention, the mandrels on the small pitch wheel are not handled one after the other. Rather the order of handling the parisons is determined by the large pitch wheel. This leads to the unique feature that the transfer means leaves out one or more mandrels on the small pitch wheel and cooperates only with each n-th mandrel. The mandrels left out are handled by subsequent revolutions of the small pitch wheel. To this end the pitch of the wheel must be selected so that each mandrel receiving position arrives at the transfer position to the transfer means after multiple revolutions of the wheel.

Accordingly the concept of the invention is to be seen in the fact that each mandrel makes a number of full revolutions on the wheel until it is taken by the transfer means for delivery to the next following wheel. It is obvious that the invention is not limited to the transfer ring of mandrels from a small pitch wheel to a large pitch wheel. Also, it is possible to use a simple transfer means to delivery mandrels from a large pitch wheel to a small pitch wheel.

The transfer means may take a variety of structures. For example, gripping levers or pivoting rotating arms may be provided. In any case the drive means are substantially simplified as no decelerated and accelerated motions are necessary. The motion cycle of the transfer means is merely determined by the speed and the peripheral distance of the mandrel receiving positions on the large pitch wheel. The design of the small pitch wheel according to the invention ensures the proper time of receiving or delivering a mandrel.

According to the invention, it is particularly advantageous that the transfer means be defined to be a transfer wheel. From this results that the pitch of the transfer wheel is the same as the pitch of the wheel having the larger pitch thus being a multiple times larger than the pitch of the wheel having the small pitch. The transfer wheel thus is provided with mandrel receiving positions at fixed peripheral distances. Further the transfer wheel is driven in synchronism with the wheels being located upstream and downstream.

A further embodiment of the invention comprises a feed wheel, a heating wheel and a blow wheel, wherein the blow wheel and the feed wheel have the same pitch. A transfer wheel according to the invention is then required between the feed wheel and the heating wheel allow to passing over from the large to the small pitch and a further transfer wheel is provided between the heating wheel and the blow wheel to allow the transfer from the small pitch to the large pitch. The parisons being positioned on the heating wheel having the small pitch thus pass through the stationary heating means a number of times. The multiple revolution results in a parison which has a relatively small temperature gradient across its wall thickness, since certain time periods occur between subsequent heating times in which time periods the parison is not heated, thus resulting in a temperature equilization between the inner and outer wall surface of the parison. It is apparent that a temperature equilization is a substantial condition for a successful blow molding process.

The advantages of the invention are summarized as follows:

While the pitch of the blow wheel is eventually determined by the diameter of the final article, the pitch of the heating wheel may be sufficiently small that the heating energy is utilized at its best without requiring changes of transport velocity of the transfer means which are thus extremely simple and show no dynamic problems in its mechanical design.

Other objects and advantages of the invention will be readily apparent from the following detailed description, taken in conjunction with the annexed drawings on which is shown a preferred embodiment of the invention.

BRIEF DESCRIPTION OF DRAWING

In the drawing:

FIG. 2 is a top plan view of a portion of FIG. 1 on enlarged scale incorporating an additional temperature equalization wheel.

FIG. 1 shows a feeding wheel 10, a heating wheel 20 and a blow wheel 30 as well as transfer wheels 40, 50 and 60. The wheels are continuously driven by a drive means (not shown) in synchronism with each other as shown by the arrows. Mandrel receiving means 11 are equidistantly spaced along the periphery of all wheels to support mandrels (not shown) by magnetic means for example.

Figure 1:
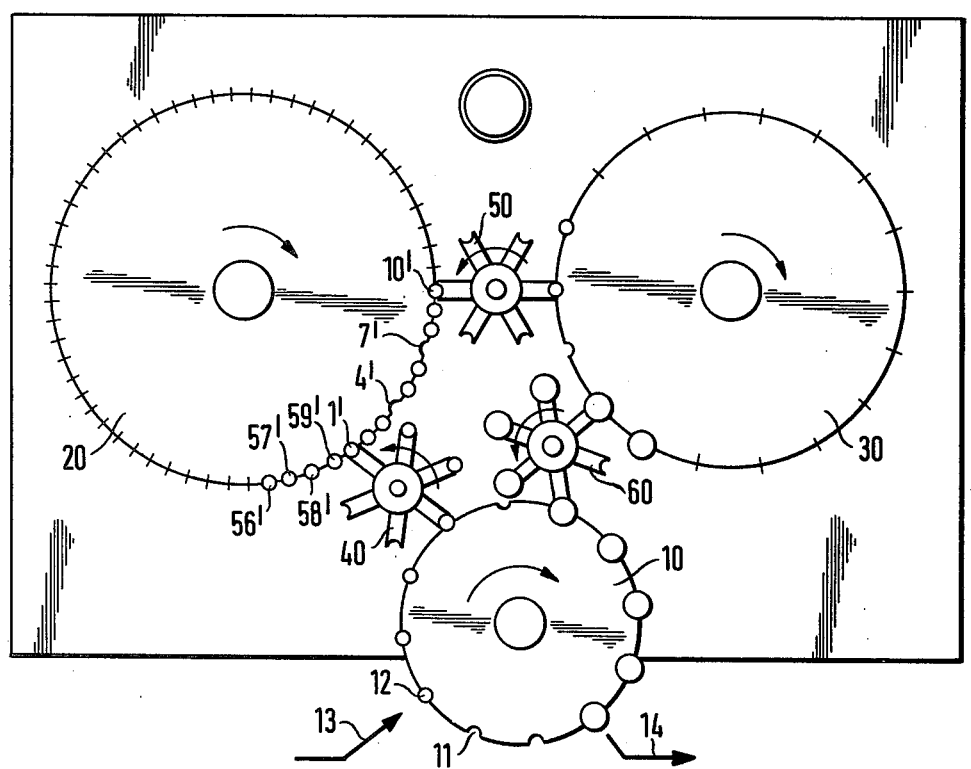
FIG. 1 is a top plan view of a blow molding machine.

The parisons 12 are positioned on the mandrels of the feeding wheel 10 at the location 13 by a conveyor means and are subsequently taken out by the transfer wheel 40 and inserted into a mandrel receiving means of the heating wheel. The heating devices are not shown. The parisons and heated up and are taken from the heating wheel 20 by the transfer wheel 50 and then delivered to the blow or blowing wheel 30 with which blowing stations (not shown) are associated. After a blowing of the final articles the mandrels are delivered from the blow wheel via the transfer wheel 60 to the feed wheel 10 where the articles are removed at the position 14, the mandrels being then transported to the feed location 13 to take up further parisons.

The peripheral distances of the mandrel receiving positions of the blow wheel 30 and of the feed wheel 10 are identical so that transferring the mandrels from the wheel 30 onto the feed wheel 10 is possible without any difficulties. For example, the blow wheel includes 18 mandrel receiving positions the distances of which are determined by the size of the blow mold stations (not shown). While feed wheel includes 12 mandrel receiving positions. It is to be understood that feed wheel and blow wheel are the wheels having a large pitch.

To the contrary, the heating wheel is the wheel having a small pitch and including, for example, 59 mandrel receiving positions altogether. The pitch of the transfer wheels is identical with the pitch of the blow wheel and the feed wheel. The pitch of the heating wheel 20 is selected so that the transfer wheel 50 skips two mandrels and only takes up each third mandrel. The transfer wheel 40 then feeds parisons from the feeding wheel 10 into the mandrel receiving positions which are, for example, indicated by reference numerals 4', 7' and 10' which have been previously freed in this manner. Accordingly, each third mandrel is taken out in the embodiment shown so that all 59 mandrels on the heating wheel will be taken out after the third revolution of the heating wheel. The number of mandrel receiving positions on the heating wheel must be selected such that all mandrels are accessible to the transfer wheel.

During to feeding of the heating wheel by means of the transfer wheel 40 the mandrel receiving positions 1', 4', 7' and so on up to 58' are supplied with parisons in the first revolution of the heating wheel 20. As the mandrel receiving position 59' is located between the position 58' and the position 1' the second orbit or revolution of the heating wheel allows to supply parisons to the mandrel receiving positions 2', 5', 8' and so on up to 59'. During the third revolution of the heating wheel the transfer wheel fills the position 3', 6', 9' and so on up to 57'. Thus all position of the heating wheel are occupied by parisons.

From the above it is apparent that the parison which is first fed into position 1' of the heating wheel passes, at the end of the first and of the second revolution, the transfer wheel 50 without being gripped thereby. Only after termination of the third revolution will this first parison be taken by the transfer wheel 50 and carried to the blow wheel. In this manner all parisons are removed after a revolving three times of the heating wheel.

The number N of the mandrel receiving positions of the heating wheel can be calculated as follows:

$$N = n \cdot Z \pm 1,$$

wherein $n \geq 2$, and

Z is an integral number.

According to FIG. 2 a temperature equalization wheel 70 is provided between the heating wheel 20 and the blow wheel 30 to obtain a prolonged equalizing time for the parisons which results in an improved equalization between the wall temperature between inside and outside. The equalization wheel has the same pitch as the heating wheel. The equalization wheel 70 thus employs the same principle of a multiple revolution as the heating wheel 20. The equalization wheel is fed from the transfer wheel 80 having a large pitch and the transfer wheel 50a delivers the parisons to the blow wheel 30.

What is claimed is:

1. Blow molding apparatus comprising a rotatable blowing wheel having a plurality of equally spaced mandrel receiving stations at the periphery thereof, a rotatable heating wheel having a plurality of equally spaced mandrel receiving stations at the periphery thereof, the number of mandrel receiving stations on the heating wheel being greater than the number of stations on the blowing wheel and equal to $nZ \pm 1$ wherein $n \geq 2$ and Z is an integer, a rotatable supply wheel having a plurality of equally spaced mandrel receiving stations at the periphery thereof, the mandrel receiving stations on the rotatable supply and blowing wheels having the same pitch, a first rotatable transfer wheel between the supply wheel and the heating wheel for transferring mandrels one by one, in succession, from the supply wheel to the transfer wheel, the transfer wheel having the same pitch as the supply wheel and a greater pitch than the heating wheel, the transfer wheel rotating in synchronism with the supply and heating wheels such that the mandrels which are taken one by one, in succession, by the transfer wheel from the supply wheel, are deposited in every nth mandrel receiving station on the heating wheel, a second rotatable transfer wheel between the heating wheel and the blowing wheel for transferring mandrels from the heating wheel to the blowing wheel, the second transfer wheel having the same pitch as the blowing wheel and therefore a greater pitch than the heating wheel, said second transfer wheel rotating in synchronism with the blowing and heating wheels such that every nth mandrel is taken from the heating wheel in offset relation relative to the deposit of the mandrels by the first transfer wheel so that is requires n revolutions of the heating wheel before the supplied mandrels are transferred to the blowing wheel whereby a parison on each mandrel will undergo heating by a stationary heating means n times resulting in a relatively small temperature gradient across the wall thickness of the parison, and a third rotatable transfer wheel having the same pitch as the blowing wheel for removing the mandrels one by one from successive stations on the blowing wheel, whereby the transfer wheels are driven at uniform speed without delayed or accelerated motions.

2. Apparatus as claimed in claim 1 comprising a rotatable temperature equalization wheel interposed between the heating and blowing wheels and having a plurality of mandrel receiving stations equal in pitch to the stations on the heating wheel and a further transfer wheel for transferring mandrels from the heating wheel to the temperature equalization wheel, said second transfer wheel transferring the mandrels from the temperature equalization means to the blowing wheel.

3. Apparatus as claimed in claim 1 wherein said third transfer wheel is positioned to transfer mandrels from the blowing wheel back to the supply wheel.

* * * * *